United States Patent Office 3,553,805
Patented Jan. 12, 1971

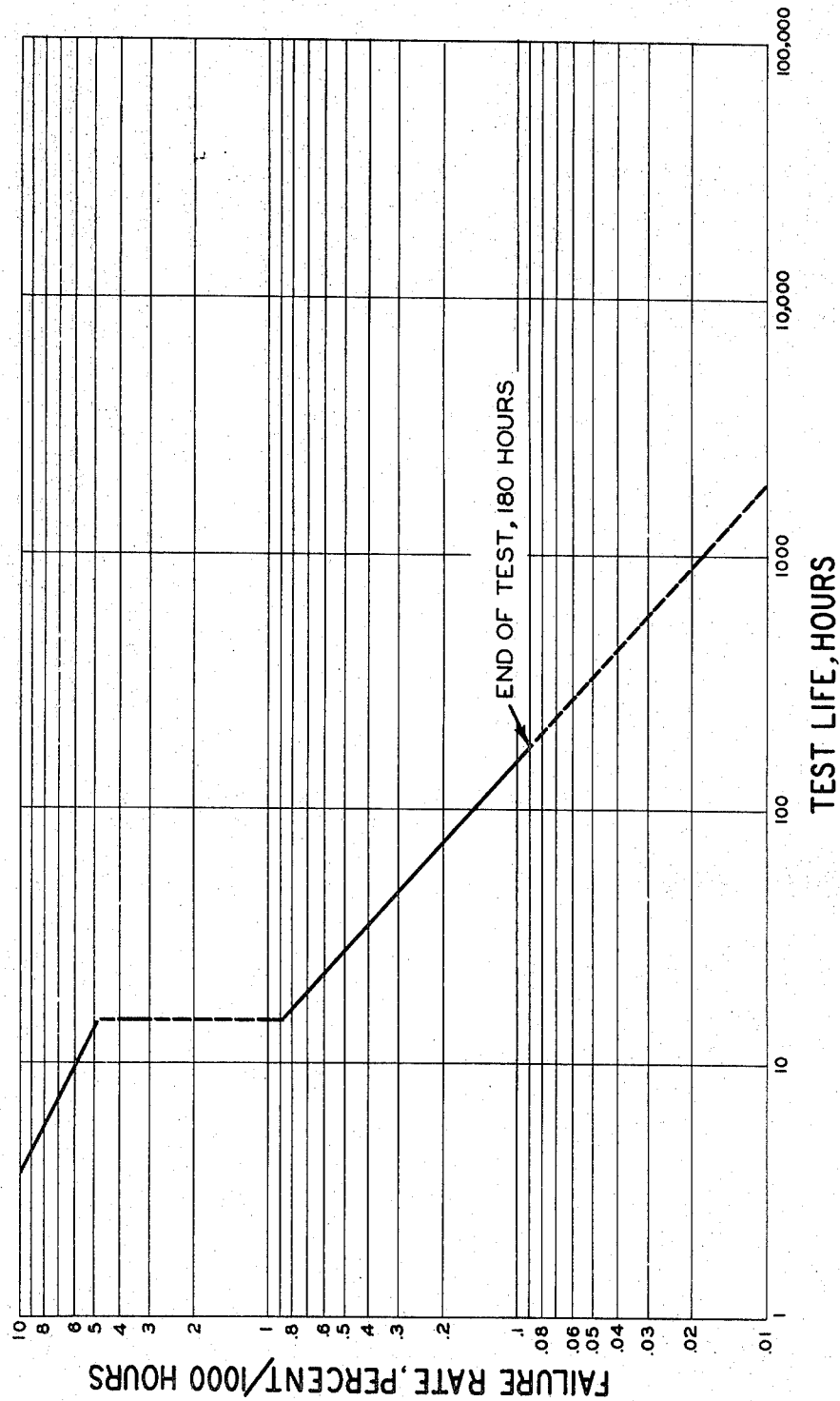

3,553,805
PRODUCTION OF GRADED RELIABILITY
CAPACITORS
George H. Didinger, Jr., Bay Village, Ohio, assignor to Union Carbide Corporation, a corporation of New York
Continuation of applications Ser. No. 314,256, Oct. 7, 1963, Ser. No. 637,010, May 8, 1967, and Ser. No. 742,952, June 19, 1968, all now abandoned. This application Apr. 22, 1969, Ser. No. 818,449
Int. Cl. B23q 17/00; H01g 13/00
U.S. Cl. 29—25.42                                       11 Claims

ABSTRACT OF THE DISCLOSURE

Process for obtaining selected capacitors having graded reliabilities from a lot of capacitors of unknown reliabilities by performing accelerated life tests.

---

This application is a continuation of applications Ser. No. 742,952, filed June 19, 1968, Ser. No. 637,010, filed May 8, 1967, and Ser. No. 314,256, filed Oct. 7, 1963, all of which are now abandoned.

This invention relates to a process for producing solid electrolyte capacitors having specific graded reliability and more particularly, it relates to a process of testing solid electrolyte capacitors to obtain such graded reliability.

Solid electrolyte capacitors are known in the art. They are generally prepared by sintering powder particles of a metal capable of forming an oxide surface thereon to form a sintered porous metal anode. Such film-forming metals are tantalum, aluminum, tungsten, columbium, hafnium, titanium and zirconium. Tantalum is the preferred metal. This anode is then coated with an oxide layer in an electrolytic process. The resulting anode oxide layer, such as tantalum oxide, forms the dielectric between the anode and a subsequently applied cathode. The successful operation of the resulting capacitor depends to a large extent upon the continuity of this anode oxide layer. In order to improve the quality of the capacitors produced from such oxidized anodes, a semi-conductive solid electrolyte layer is applied to the dielectric layer. This semi-conductive layer can obviate imperfections in the dielectric layer. A typical and preferred material for the semi-conductive layer is manganese dioxide. The manganese dioxide can conveniently be formed in situ by dipping the previously oxidized anode in a saturated manganese nitrate solution. The so-treated anode is then removed from the manganese nitrate solution and placed in an oven where it is heated to a high temperature (about 250–400° C.) to convert the manganese nitrate to a semi-conducting manganese oxide. The dipping and heating steps are generally repeated several times in order to provide as complete as possible filling of the pores of the porous anode with manganese oxide. The anode is finally oxidized again in an electrolytic process to modify the manganese oxide structure opposite any defects in the anode oxide layer. The manganese oxide in and around these areas is converted to other more insulating forms of manganese oxide. This converted manganese oxide helps reduce direct current leakage through any defects in the anode oxide dielectric layer. The remaining portion of the manganese oxide acts as the solids electrolyte for the capacitor. The cathode is then prepared by applying a conductive metal layer, such as a silver paint, to the processed anode. Preferably, a conductive graphite layer is applied to the oxidized anode before the cathode layer is applied. The capacitor is completed by attaching separate terminal leads to the sintered anode and the conductive metal cathode and sealing the components inside a protective case, such as a suitable metal can or plastic encapsulating material.

The above solid electrolyte capacitors are intended for use in filtering and by-pass electronic circuits where the alternating current voltage is small compared to the direct current voltage. Such capacitors also should have performance characteristics wherein they can be reliably used for a specified period of time before failing. Since all parts will fail given enough time, a reasonable measure of quality is the mean time to failure or the mean time between failures. These times are related to the failure rate. If the relationship is known, it is possible to compute the probability that a system containing a prescribed number of parts will survive for a required time. This probability of survival is called the reliability of the system. Reliability of a high order is required for military and spacecraft programs wherein components, such as capacitors, are to be placed in service for years of intended service and wherein replacement of any failed components is difficult and in many instances, such as space satellites, replacement is impossible. Previous techniques for testing reliability of capacitors have assumed that for the most part capacitors in use will fail at approximately a constant rate throughout their useful lives. Random selection of a specified number of samples from a large batch of capacitors is used to obtain the capacitors for test. This sample is determined by using well-known statistical sampling calculations and techniques. These test capacitors are then placed under the rated direct current voltages for the capacitors and operated until some of them start to fail, generally by short-circuiting caused by dielectric failure. The total operating hours to each failure is noted and a failure rate is calculated and expressed in percent of test lot which failed after 1000 hours of operation. This failure rate is a measure of the reliability of the capacitors. Actually, it is an estimate of the reliability of the samples only, since the unsampled remainder of the large batch of capacitors can have reliabilities better or worse than the test capacitors. Testing of all capacitors is impractical using prior art techniques since well-made solid electrolyte tantalum capacitors, for example, can have mean times between failure of at least about five million capacitor hours under rated conditions and upwards of 100 million capacitor hours with moderate derating. A failure time of five million hours signifies that one failure would be experienced if five million capacitors were tested for one hour or if one capacitor were tested for five million hours or if a combination of multiple capacitors were tested for a total of five million capacitor-hours. Even when testing only a representative sample number of capacitors having mean lifetimes of a million hours or more, economy of time generally requires the calculation of an estimated mean life after the first failure of a test capacitor has been observed.

This obviously reduces the precision of the estimate and the width of an interval of any chosen percent confidence is widest when the estimate of mean lifetime is based upon one failure. The confidence interval narrows as more failures are obtained upon which to base the estimate, but such multiple failures can require an almost impractical length of time on test. The capacitors could actually become obsolete before the test results were available.

In accordance with the present invention, the reliability of capacitors can be determined with greater accuracy than that obtained by prior art techniques by subjecting all the capacitors, not just a random sample, to accelerated life tests until all surviving capacitors have achieved a predetermined desired instantaneous failure rate. Reliability in service under varying environmental conditions can be improved when all the capacitors subjected to the accelerated life test have previously been subjected to immersion in boiling water to test the hermetic seal of the capacitor protective case and also subjected to shock and to temperature cycling. All the capacitors which survive the accelerated life test must pass measurements of direct current leakage, capacitance and dissipation factor, and X-ray examination. The surviving capacitors all will have passed the screening tests and all will have the desired failure rate. These capacitors thus have a known reliability in terms of actual measured failure rate and not an estimated value.

As used herein, the term "graded reliability" means a measured instantaneous failure rate, expressed as percent of samples per 1000 hours of performance, which meets predetermined selected values. The terms "failure," or "catastrophic failure" mean a change in the characteristics of the capacitor such that the leakage current increases to a relatively high value. At this point the device ceases to function as a capacitor. Practically, "failure" can be defined as the condition where the direct current leakage current exceeds 1 milliampere. Such condition generally results from a short circuit between the anode and cathode through dielectric failure. The term "rated voltage" relates to the specific direct current working voltage at 85° C. designated for the particular type of capacitors being produced or tested. The DC working voltage at 125° C. for example, is somewhat lower than the rated voltage. The working voltage can be applied continuously in service. The dissipation factor in an alternating current circuit is the ratio of the equivalent series resistance to the equivalent reactance. In the case of a capacitor its dissipation factor is measured as the cotangent of the phase angle of the capacitor.

FIG. 2 is plot of instantaneous failure rate in percent/1000 hours vs. test time in hours for a typical batch of solid electrolyte capacitors tested in accordance with the present invention.

Figure 1:
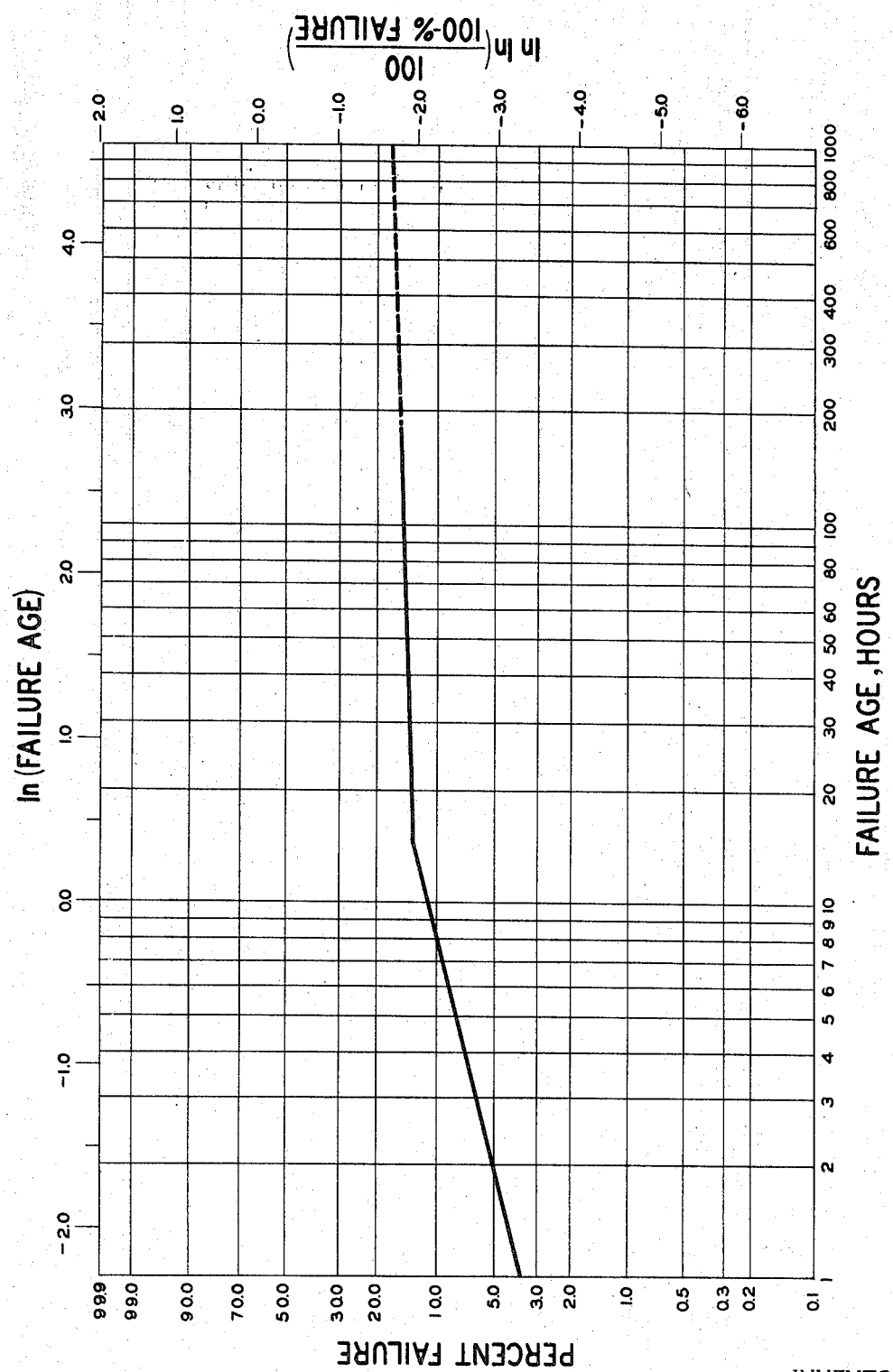
FIG. 1 is a Weibull plot of cumulative percent failures vs. failure-age in hours for a typical batch of solid electrolyte capacitors tested in accordance with the present invention.

The classical behavior of instantaneous failure rate with time for component populations involves three failure rate periods. The first period is known as the debugging period. This period is characterized by a decreasing failure rate caused by the inherently defective or weak members of the population being tested being removed through the process of their early random failures. The second period is generally known as the useful life period. Occasional failures during this period, randomly distributed with respect to time, will produce a corresponding constant failure rate. The third period is characterized by a rising instantaneous failure rate. This rise of the failure rate is attributable to the final deterioration of the remaining members of the population being tested and signifies the beginning of the wearout period.

A distribution function capable of completely describing the three classical reliability periods of decreasing, constant and increasing failure rates is known as the Weibull distribution and is described as follows:

$$F(x) = 1 - e^{-\frac{(x-\gamma)^\beta}{\alpha}}, \text{ for } x \geq \gamma$$
$$F(x) = 0, \text{ otherwise;}$$

wherein $F(x)$ is the cumulative distribution function (c.d.f.) of the population. If the variable $x$ is the time to failuure and a value of failure time X is assigned to each member of the population, then $F(x)$ is defined as the number of all individuals with an $X \leq x$, divided by the number of individuals in the population. Thus $F(x)$ is the cumulative percentage of the population which has failed up to time $x$. In the above formula, $\alpha$=scale parameter, $\beta$=shape parameter and $\gamma$=location parameter where $x \geq \gamma$. (In practice, $\gamma$ is usually zero).

From the above-described Weibull cumulative distribution function (c.d.f.) several other functions can be computed. The probability of a failure $f(x)$ at any time $x$ is given by the Weibull probability distribution function (p.d.f.) which is the first derivative of the c.d.f.

$$f(x) = \frac{\beta}{\alpha}(x-\gamma)^{\beta-1} e^{-\frac{(x-\gamma)^\beta}{\alpha}}$$

The percentage of the population which has survived up to time $x$ is called the Reliability or Survival function $R(x)$ and equals one minus the percentage of the population has failed up to time $x$:

$$R(x) = 1 - F(x) = e^{-\frac{(x-\gamma)^\beta}{\alpha}}$$

The instantaneous failure rate $Z(x)$ equals the probability of a failure at any time $x$ divided by the percentage of the population surviving at time $x$:

$$Z(x) = \frac{f(x)}{R(x)} = \frac{\beta}{\alpha}(x-\gamma)^{\beta-1}$$

To facilitate the use of the Weibull c.d.f., the following transformation is performed wherein "ln" indicates the natural logarithm to the base $e$.

$$F(x) = 1 - e^{-\frac{(x-\gamma)^\beta}{\alpha}}$$

$$1 - F(x) = e^{-\frac{(x-\gamma)^\beta}{\alpha}}$$

$$\frac{1}{1 - F(x)} = e^{\frac{(x-\gamma)^\beta}{\alpha}}$$

$$\ln\left(\frac{1}{1 - F(x)}\right) = \frac{(x-\gamma)^\beta}{\alpha}$$

$$\ln \ln\left(\frac{1}{1 - F(x)}\right) = \beta \ln(x-\gamma) - \ln \alpha$$

The transformed Weibull c.d.f. is now in the form of an equation of a straight line.

$$Y = mX + b$$

where $$Y = \ln \ln\left(\frac{1}{1 - F(x)}\right)$$
$$m = \beta$$
$$X = \ln(x - \gamma)$$
$$b = -\ln \alpha$$

Weibull Probability paper is available having ln $$\ln \frac{1}{1-F(x)}$$

as its principal ordinate and with ln $(x-\gamma)$ as its principal abscissa. An example of this paper is shown in FIG. 1. The paper also includes two auxiliary scales which permit the direct plotting of exact failure ages $(x-\gamma)$ and their corresponding estimates of the c.d.f. $F(x)$. In the use of such paper, the cumulative percent failures and the corresponding failure-ages are plotted as points on the Weibull paper. A straight line is fitted through these points to give an estimate of the Weibull c.d.f. The slope of the line provides the estimate of the shape parameter $\beta$, while the $y$ intercept of the line with the principal ordinate provides an estimate of $-\ln\alpha$ from which the scale parameter $\alpha$ can be calculated.

The above discussion concerning the Weibull distribution function and its related calculations is related to the life testing step in the process of the present invention. The capacitors under test are placed in parallel in circuits containing, for example, about 200–400 capacitors. Such circuits apply direct current voltage from a low impedance power supply (less than 3 ohms impedance exclusive of capacitors). Each circuit is protected with a one-ampere, fast-acting circuit-breaker, for example. Consequently, when any one of the capacitors in the test circuit suffers a breakdown, the circuit breaker opens and auxiliary contacts stop a running-time meter and cause an alarm circuit to activate an alarm. It is thus possible to obtain the exact failure age for each failure which occurred. The faulty capacitor is removed and the test is continued after re-setting the circuit breaker. As the failures accumulate, a record is kept of the accumulated hours on test, accumulated number of failures and percent which failed. These data are plotted on Weibull paper and the instantaneous failure rate $Z(x)$, can be calculated for any given accumulated test time. An alternate test method employs circuits containing individual fuses in series with each capacitor. A group of these individual capacitor-fuse circuits is connected in parallel on a panel and a current pulse sensing circuit is placed in one of the common leads. When a capacitor fails, its individual fuse blows and the concurrent current pulse is detected. The output of the detection or sensing circuit causes the panel number and exact failure age from a digital clock to be recorded on paper tape, punched tape or other media. Manual or computer processing of this data yields the required instantaneous failure rate information. The life test is continued until the $Z(x)$ value reaches the predetermined specification failure rate at which time the life test is concluded. The surviving capacitors from this life test will all have the desired instantaneous failure rate based on the total test life and a high degree of confidence can be placed in this failure rate value with respect to the reliability of these tested capacitors. Furthermore, from this life test data, the Weibull c.d.f. can be computed and thus a probability assigned to these capacitors as to a failure of any one of them within a specified additional time in use.

It has been found that when life-testing solid electrolyte capacitors, a plot of the failures on Weibull paper has a slope less than 1. This indicates that life testing actually improves the life expectancy of capacitors which survive the test since the failure rate continues to decline (slope of Weibull plot less than 1). In addition, it has been found that this behavior continues when voltages higher than rated values are applied. A relationship between higher applied voltage and rated voltage has been developed such that the failure rate at rated voltage can be derived from the failure rate at the higher applied voltage. In essence, this relationship provides a means for accelerating the testing time. "Acceleration factors" for such testing are listed in the following table.

TABLE

| | Ratio of applied voltage to rated voltage | |
|---|---|---|
| | 85° C. | 125° C. |
| Acceleration Factor: | | |
| 1 | 1.00 | 0.67 |
| 10 | 1.16 | 0.81 |
| 100 | 1.32 | 0.96 |
| 1,000 | 1.475 | 1.12 |
| 10,000 | 1.63 | 1.28 |
| 100,000 | 1.79 | 1.44 |
| 1,000,000 | 1.94 | 1.60 |

The significance of the above "acceleration factor" is that one hour of test at an acceleration factor of 10, for example, is equivalent to 10 hours of testing at rated voltage. The above table includes values from "no acceleration," i.e. factor of 1, wherein as low as 0.67 times rated voltage can be applied at 125° C., up to an acceleration factor of 1,000,000 having 1.94 times rated voltage at 85° C. The useful range of applied voltage during the life testing is from about 0.67 to about 1.94 times rated voltage of the capacitor at testing temperatures of about 85–125° C. Preferably, the life testing is carried out at acceleration factors of 10 to 10,000 wherein the applied voltage is from about 1.2 to about 1.6 times rated voltage at 85° C. While the above testing temperatures are preferred since they are the temperatures generally specified by capacitor users, testing temperatures in the range of from 25° C. to about 125° C., can be used. At temperatures different from 85° C. and 125° C. the above specific acceleration factors do not apply, but appropriate factors can be readily obtained at any desired temperature.

The above discussion of determination of instantaneous failure rate from the Weibull distribution plots requires plotting the calculated instantaneous failure rate data and extending the plot to determine the test time required to obtain a specific failure rate. An alternative procedure of solving the Weibull failure rate function to obtain the maximum required test time to achieve a given failure rate is to plot the Weibull distribution according to the above described procedure and from this plot determine the slope ($\beta$) and the $\ln\alpha$. From $\ln\alpha$, $\alpha$ can be calculated and the ratio $\beta/\alpha$ can be calculated. The desired acceleration factor is applied during testing and the values of $\beta/\alpha$ and the acceleration factor are inserted in the following equation:

Failure rate at 1 hour $(x=1)=$ $$\frac{\beta}{\alpha}\left(\frac{1}{\text{acceleration factor}}\right) 10^5$$

in percent/1000 hours.

The ln of the one hour failure rate is then calculated as well as the ln of the desired failure rate for the capacitors. The ln of the required test time is then calculated from the following equation:

$$\ln(\text{required test time}) = \frac{\ln(\text{desired failure rate}) - \ln(\text{failure rate at 1 hour})}{\beta - 1}$$

From this ln of required test time, the test time can be calculated. The capacitors should be placed on life test at the specified acceleration factor for the above calculated period of time and the surviving capacitors will therefore have the desired instantaneous failure rate.

While the above described accelerated life testing step with its related use of Weibull distribution functions is a major advance in the art of producing solid electrolyte capacitors of high reliability, other process steps must also be carried out before and after life testing in order to insure the maximum in reliability.

Preceding the accelerated life testing, all of the capacitors must be subjected to environmental extremes to allow for varying service condition. For example, all capacitors are immersed in water at normal ambient conditions. The water and immersed capacitors are then heated to boiling under atmospheric pressure and such boiling conditions are maintained until all the immersed capacitors reach thermal equilibrium with the boiling water. This generally requires about 10 minutes. The water and immersed capacitors are then cooled to 25° C.+5° C. at a rate less than 10° C. per minute. The capacitors are then removed from the water and dried externally. This immersion treatment tests the integrity of the protective case surrounding the capacitor. A faulty seal will allow penetration of water into the capacitor which will then be detected as electrical DC leakage. The dried capacitors from the above immersion test are then subjected to a "burn in" test where DC voltage, at least equal to the rated voltage is applied for a period of time, e.g., for 24 hours.

All capacitors are then subjected to shock wherein the mechanical structure of the capacitor is tested for resistance to shock damage. This treatment involves subjecting the capacitors to at least four blows in a direction substantially normal to the major axis of the capacitors. Such blows shall be delivered within 2 seconds and each blow shall develop an acceleration of 500 to 700 G for 0.2 to 0.3 millisecond. The acceleration of 500 to 700 G represents 500 to 700 times the normal acceleration of earth gravity.

All the capacitors which were subjected to the above shock treatment are then subjected to temperature cycling through the range from 25° C. to −55° C. to 25° C. to 125° C. and then back to 25° C. This treatment which tests the ability of the capacitors to withstand temperature expansions and contractions involves subjecting the capacitors to a temperature cycle of −55° C. (+0° C., −3° C.) for 30 minutes, 25° C. (+10° C., −5° C.) for 15 minutes, 125° C. (+3° C., −0° C.) for 30 minutes and 25 C. (+10° C., −5° C.) for 15 minutes. This temperature cycle is then repeated for a total of five cycles.

All of the capacitors which survive the above described immersion, shock and temperature cycle tests are then subjected to accelerated life tests at a predetermined acceleration rate and temperature.

The survivors of the accelerated life testing are subjected to further screening tests. Each capacitor is tested for direct current leakage current by well known techniques by applying the direct current rated voltage for the capacitor for a maximum electrification period of 5 minutes and rejecting all capacitors having leakage current above a desired maximum value.

Each capacitor which survives the leakage current test is measured for its capacitance by well known techniques at a test frequency of 120±1 cycles per second. All capacitors failing to have capacitance values within the specified capacitance limits will be rejected.

Each capacitor which survives the above capacitance check is measured for its dissipation factor. The dissipation factor is measured by well known techniques at a frequency of 120±1 cycles per second by means of a polarized capacitance bridge. All capacitors failing to have dissipation factors below the maximum desired dissipation factor limit are rejected.

All capacitors which survive the above dissipation factor test are subjected to X-ray examination to detect internal mechanical faults, such as poor soldering, loose particles, improper voids, misaligned anodes and seals or other structural weaknesses.

The survivors of all the above tests are solid electrolyte capacitors having known measured reliabilities which are higher and more accurate in their determination than prior art solid electrolyte capacitors whose reliabilities were determined by random sampling and which were not subjected to accelerated life testing plus the other performance checks set forth in the present novel process. Since all the capacitors are tested, both sampling errors and the need of consideration of confidence levels are elminiated The overall process of producing capacitors and testing them by a specific procedure is also novel in the production of graded reliability capacitors.

Capacitors produced and tested in accordance with the present invention have, for example, graded reliabilities with failure rates from 10 to 0.00001 percent per 1000 hours. Such capacitors have rated voltages from about 6 to about 100 volts, for example. Capacitance values from about 0.0047 microfarad to about 330 microfarads, for example, have also been employed.

The following example describes an application of the present invention to the production of high reliability capacitors.

EXAMPLE

A batch of 3.3 microfarads, 50 volt tantalum capacitors consisting essentially of sintered tantalum anodes, tantalum oxide dielectrics, manganese dioxide solid electrolytes, graphite and silver paint cathodes sealed in aluminum cans and containing 570 units were subjected to immersion, shock and temperature cycling tests as described above. The capacitors were then subjected to accelerated life test at 85° C. and 1.32 times rated voltage (Acceleration factor of 100). It was intended to produce capacitors having a failure rate of 0.1 percent per 1000 hours. The following data were obtained:

| Accumulated hours on test | Breakdown failures | Accumulated failures | Percent failures, $F(x)$ |
|---|---|---|---|
| <1.00 | 23 | 23 | |
| 1.07 | 1 | 24 | 4.21 |
| 1.19 | 1 | 25 | |
| 1.42 | 1 | 26 | |
| 1.50 | 1 | 27 | 4.73 |
| 1.54 | 1 | 28 | |
| 1.75 | 1 | 29 | |
| 2.29 | 1 | 30 | 5.26 |
| 2.33 | 1 | 31 | |
| 2.45 | 1 | 32 | |
| 2.49 | 1 | 33 | |
| 2.53 | 1 | 34 | |
| 2.56 | 1 | 35 | |
| 3.25 | 2 | 37 | 6.5 |
| 3.47 | 1 | 38 | |
| 3.58 | 1 | 39 | |
| 3.71 | 1 | 40 | |
| 4.04 | 1 | 41 | 7.2 |
| 4.41 | 1 | 42 | |
| 4.52 | 1 | 43 | |
| 4.66 | 1 | 44 | |
| 4.67 | 1 | 45 | |
| 4.90 | 1 | 46 | |
| 5.00 | 1 | 47 | 8.25 |
| 5.09 | 1 | 48 | |
| 5.37 | 1 | 49 | |
| 5.57 | 1 | 50 | |
| 5.69 | 1 | 51 | |
| 5.82 | 1 | 52 | |
| 6.10 | 1 | 53 | 9.3 |
| 6.51 | 1 | 54 | |
| 6.64 | 1 | 55 | |
| 6.93 | 1 | 56 | |
| 7.33 | 1 | 57 | 10.0 |
| 8.01 | 1 | 58 | 10.2 |
| 8.09 | 1 | 59 | |
| 8.14 | 1 | 60 | |
| 8.47 | 1 | 61 | |
| 8.63 | 1 | 62 | |
| 8.77 | 1 | 63 | |
| 8.93 | 1 | 64 | |
| 8.99 | 1 | 65 | 11.4 |
| 9.42 | 1 | 66 | |
| 9.55 | 1 | 67 | |
| 9.59 | 1 | 68 | |
| 10.44 | 1 | 69 | 12.1 |
| 11.05 | 1 | 70 | |
| 11.40 | 1 | 71 | |
| 11.50 | 1 | 72 | |
| 11.68 | 1 | 73 | |
| 12.30 | 1 | 74 | 12.9 |
| 13.68 | 1 | 75 | 13.1 |
| 13.81 | 1 | 76 | 13.3 |
| 14.52 | 1 | 77 | 13.5 |
| 14.91 | 1 | 78 | 13.7 |
| 17.08 | 1 | 79 | 13.85 |
| 19.75 | 1 | 80 | 14.00 |
| 20.60 | 1 | 81 | 14.2 |
| 25.87 | 1 | 82 | 14.4 |
| 28.05 | 1 | 83 | 14.5 |
| 32.87 | 1 | 84 | 14.6 |
| 37.37 | 1 | 85 | 14.9 |
| 44.64 | 1 | 86 | 15.1 |
| 81.22 | 1 | 87 | 15.25 |
| 88.39 | 1 | 88 | 15.4 |
| 99.26 | 1 | 89 | 15.6 |
| 125.76 | 1 | 90 | 15.8 |
| 162.26 | 1 | 91 | 15.9 |
| 180 | 0 | 91 | |

The percent failures were plotted on Weibull paper vs. failure ages. This is shown in FIG. 1. From this plot the function parameters were determined as described above:

For failure age ($x$) from 0 to 14.8 hours
$\beta = .506$
$\alpha = 27$
$\gamma = 0$ $$\text{c.d.f.} = F(x) = 1 - e^{\frac{-(x-0)^{.506}}{27}}$$

$$\text{p.d.f.} = f(x) = \frac{.506}{27}(x-0)^{-.494} e^{\frac{-(x-0)^{.506}}{27}}$$

$$\text{failure rate} = Z(x) = \frac{.506}{27}(x-0)^{-.494}$$

For X > 14.8 hours
$\beta = .087$
$\alpha = 8.6$
$\gamma = 0$ $$F(x) = 1 - e^{\frac{-(x-0)^{.087}}{8.6}}$$

$$f(x) = \frac{.087}{8.6}(x-0)^{-.913} e^{\frac{-(x-0)^{.087}}{8.6}}$$

$$Z(x) = \frac{.087}{8.6}(x-0)^{-.913}$$

The failure rates were then plotted vs. time and are shown in FIG. 2. The life test was continued for 180 hours (as determined from the FIG. 2 chart) to produce capacitors having failure rate of .09 percent per 1000 hours. The survivors of the life test were then tested for leakage current, capacitance and dissipation factor and were X-rayed according to the above-described procedures. The resulting capacitors have measured known reliability with high degree of accuracy and confidence in the value. Such capacitors were subjected to prior art testing methods and the graded reliability failure rate values corresponded to estimated failure rate values obtained by prior art techniques. The principal point of distinction as to the reliability is that it is known for each capacitor and is not merely an estimate based on random sampling.

What is claimed is:

1. A process for testing solid electrolyte capacitors to obtain capacitors having specific graded reliability which comprises subjecting the capacitors to an accelerated life test wherein voltage is applied to the capacitors for extended periods of time; recording the exact elapsed time whenever a failure occurs to a capacitor; accumulating the number of such failures after each failure and calculating the accumulated number as a percentage of the total test batch; plotting on Weibull probability paper the cumulative failure percentage vs. the respective failure ages; solving the Weibull failure rate function rate; and then maintaining the capacitors on test until the desired failure rate is achieved; and rejecting all the capacitors which do not survive the life test.

2. A testing process as claimed in claim 1 wherein the life test is conducted at the temperature and direct current voltage set forth in the following table to achieve desired accelerated test conditions:

|  | Ratio of applied voltage to rated voltage | |
|---|---|---|
|  | 85° C. | 125° C. |
| Acceleration factor: |  |  |
| 1 | 1.00 | 0.67 |
| 10 | 1.16 | 0.81 |
| 100 | 1.32 | 0.96 |
| 1,000 | 1.475 | 1.12 |
| 10,000 | 1.63 | 1.28 |
| 100,000 | 1.79 | 1.44 |
| 1,000,000 | 1.94 | 1.60 |

3. A process for testing solid electrolyte capacitors to obtain capacitors having specific graded reliability which comprises
   (a) subjecting the capacitors to an accelerated life test wherein voltage is applied to the capacitors for extended periods of time; recording the exact elapsed time whenever a failure occurs to a capacitor; accumulating the number of such failures after each failure and calculating the accumulated number as a percentage of the total test batch; plotting on Weibull probability paper the cumulative failure percentage vs. the respective failure ages; solving the Weibull failure rate function to determine the instantaneous failure rate; and then maintaining the capacitors on test until the desired failure rate is achieved;
   (b) measuring the direct current leakage current of each test capacitor surviving the above life test of item (a) and rejecting all capacitors having leakage current above a desired maximum value;
   (c) measuring the capacitance of each capacitor passing the leakage current test of item (b) above and rejecting all capacitors failing to have capacitance values within the specified capacitance limits;
   (d) measuring the dissipation factor of each capacitor passing the capacitance test of item (c) above and rejecting all capacitors failing to have dissipation factors below the maximum desired dissipation factor; and discarding all but the surviving capacitors.

4. A testing process as claimed in claim 3 wherein the life test of item (a) is conducted at the temeprature and direct current voltage set forth in the following table to achieve desired accelerated test conditions:

|  | Ratio of applied voltage to rated voltage | |
|---|---|---|
|  | 85° C. | 125° C. |
| Acceleration factor: |  |  |
| 1 | 1.00 | 0.67 |
| 10 | 1.16 | 0.81 |
| 100 | 1.32 | 0.96 |
| 1,000 | 1.475 | 1.12 |
| 10,000 | 1.63 | 1.28 |
| 100,000 | 1.79 | 1.44 |
| 1,000,000 | 1.94 | 1.60 |

5. A process for testing solid electrolyte capacitors to obtain capacitors having specific graded reliability which comprises subjecting the capacitors to an accelerated life test wherein voltage is applied to the capacitors for extended periods of time; recording the elapsed time whenever a failure occurs to a capacitor; accumulating the number of such failures after each failure and calculating the accumulated number as a percentage of the total test batch; plotting on Weibull probability paper the cumulative failure percentages vs. the respective failure ages; solving the Weibull failure rate function to determine instantaneous failure rates as a function of testing time; and then maintaining the remaining capacitors on test for a duration of time corresponding to a desired failure rate; and rejecting the capacitors which do not survive the life test.

6. The process of claim 5 in which
   (a) the direct current leakage of each test capacitor surviving the life test is measured and all capacitors having leakage currents above a desired maximum value are rejected;
   (b) the capacitance of each capacitor passing the leakage current test of item (a) above is measured and all capacitors failing to have capacitance values within the specified capacitance limits are rejected;
   (c) the dissipation factor of each capacitor passing the capacitance test of item (b) above is measured and all capacitors failing to have dissipation factors below the maximum desired dissipation factor are rejected.

7. The process of claim 5 in which prior to the accelerated life testing, the capacitors are first subjected to a test of the integrity of the protective case, a shock test, and temperature cycling.

8. The process of claim 5 in which the life test is conducted at the temperature and direct current voltage set forth in the following table to achieve desired accelerated test conditions:

| Acceleration factor: | Ratio of applied voltage to rated voltage | |
| --- | --- | --- |
| | 85° C. | 125° C. |
| 1 | 1.00 | 0.67 |
| 10 | 1.16 | 0.81 |
| 100 | 1.32 | 0.96 |
| 1,000 | 1.475 | 1.12 |
| 10,000 | 1.63 | 1.28 |
| 100,000 | 1.79 | 1.44 |
| 1,000,000 | 1.94 | 1.60 |

9. A process for testing solid electrolyte capacitors to obtain capacitors having specific graded reliability which comprises subjecting the capacitors to an accelerated life test wherein voltage is applied to the capacitors for extended periods of time; recording the exact elapsed time whenever a failure occurs to a capacitor; accumulating the number of such failures after each failure and calculating the accumulated number as a percentage of the total test batch; plotting on Weibull probability paper the cumulative failure percentages vs. the respective failure ages; solving the following relationship to determine the time $x$ which the testing must be continued to yield a surviving group of capacitors having a selected instantaneous failure rate $Z(x)$ $$Z(x) = \frac{\beta}{\alpha} (x)^{\beta-1}$$

wherein $\beta$ is the slope of the plotted curve on the Weibull paper, and wherein $-\ln\alpha$ is the $y$ intercept of plotted curve with the principal ordinate of the Weibull paper, and then maintaining the remaining capacitors on test for a time $x$ to give a surviving group having the preselected failure rate $Z(x)$, and rejecting the capacitors which do not survive the life test.

10. A process for testing solid electrolyte capacitors to optain capacitors having specific graded reliability which comprises
   (a) immersing the capacitors in water at normal ambient conditions; heating the water to boiling and maintaining boiling conditions until all the immersed capacitors reach thermal equilibrium with the boiling water; then cooling the water and immersed capacitors to 25° C.:±5° C. at a rate less than about 10° C. per minute; removing the capacitors and drying them externally; applying voltage at least equal to the rated voltage to detect presence of water introduced through a faulty seal, and rejecting the faulty capacitors;
   (b) subjecting the capacitors to a temperature cycle of −55° C. (+0° C., −3° C.) for about 30 minutes, 25° C. (+10° C., −5° C.) for about 15 minutes, 125 C. (+3° C., −0° C.) for about 30 minutes and 25° C. (+10° C., −5° C.) for about 15 minutes and then repeating these temperature conditions for at least several additional cycles;
   (c) subjecting the capacitors to an accelerated life test at a temperature of about 85–125° C. wherein the capacitors are placed in a circuit having less than 3 ohms impedance exclusive of the capacitors being tested and wherein a direct current voltage of from about 0.67 to about 1.94 times the capacitor rated voltage is applied to such capacitors; recording the exact elapsed time whenever a catastrophic failure occurs to a test capacitor; accumulating the number of such failures after each failure and calculating the accumulated number as a percentage of the original lot size of test capacitors; plotting on Weibull probability paper the cumulative failure percentages vs. the respective failure ages; solving the Weibull failure rate function to determine the instantaneous failure rates as a function of testing time; and then maintaining the remaining capacitors on test for a duration of time corresponding to a desired failure rate, and rejecting the capacitors which do not survive the life test;
   (d) measuring the direct current leakage current of each test capacitor surviving the above life test of item (c) above after applying the direct current rated voltage for a maximum electrification period of 5 minutes and rejecting all capacitors having leakage current above a desired value;
   (e) measuring the capacitance of each capacitor passing the leakage current test of item (d) above, and rejecting all capacitors failing to have capacitance values within the desired capacitance limits;
   (f) measuring the dissipation factor of each capacitor passing the capacitance test of item (e) above, and rejecting all capacitors failing to have dissipation factors below the maximum desired dissipation factor.

11. A testing process as claimed in claim 10 wherein the life test of item (c) is conducted at the temperature and direct current voltage set forth in the following table to achieve desired accelerated test conditions:

| Acceleration factor: | Ratio of applied voltage to rated voltage | |
| --- | --- | --- |
| | 85° C. | 125° C. |
| 1 | 1.00 | 0.67 |
| 10 | 1.16 | 0.81 |
| 100 | 1.32 | 0.96 |
| 1,000 | 1.475 | 1.12 |
| 10,000 | 1.63 | 1.28 |
| 100,000 | 1.79 | 1.44 |
| 1,000,000 | 1.94 | 1.60 |

References Cited

UNITED STATES PATENTS

| 3,073,007 | 1/1963 | Rubinstein | 29—25.42 |
| 3,093,883 | 6/1963 | Haring | 29—25.42 |
| 3,100,329 | 8/1963 | Sherman | 29—570 |

JOHN F. CAMPBELL, Primary Examiner

D. C. REILEY, Assistant Examiner

U.S. Cl. X.R.

29—25.42, 570, 593; 73—432; 324—60